United States Patent [19]

Sticht

[11] Patent Number: 5,007,796
[45] Date of Patent: Apr. 16, 1991

[54] HANDLING SYSTEM FOR WORKPIECES

[76] Inventor: Walter Sticht, Karl-Heinrich-Waggerl-Strasse 8, A-4800 Attnang-Puchheim, Austria

[21] Appl. No.: 488,442

[22] Filed: Feb. 27, 1990

Related U.S. Application Data

[63] Continuation of Ser. No. 300,222, Jan. 23, 1989, abandoned, which is a continuation of Ser. No. 175,608, Mar. 28, 1988, abandoned, which is a continuation of Ser. No. 804,292, Dec. 3, 1985, abandoned.

[30] Foreign Application Priority Data

Dec. 7, 1984 [AT] Austria .................................. 3887/84

[51] Int. Cl.⁵ .............................................. B25J 15/04
[52] U.S. Cl. ................................... 414/751; 414/753; 901/7; 901/36; 294/116
[58] Field of Search ................. 901/30, 7; 414/751, 414/753

[56]  References Cited

U.S. PATENT DOCUMENTS

| 2,487,128 | 11/1949 | Hahn | 403/378 X |
|---|---|---|---|
| 2,815,866 | 12/1957 | Watter | 901/39 X |
| 3,371,953 | 3/1968 | Blatt | 901/37 X |
| 3,630,391 | 12/1971 | Wilson | 901/36 X |
| 3,773,189 | 11/1973 | Kitamura et al. | 901/37 X |
| 3,921,820 | 11/1975 | Crockett | 901/37 X |
| 4,293,268 | 10/1981 | Mink | 901/31 X |
| 4,412,293 | 10/1983 | Kelley et al. | 901/38 X |
| 4,599,037 | 7/1986 | Ross et al. | 901/37 X |
| 4,607,998 | 8/1986 | Hawkes | 901/37 X |

FOREIGN PATENT DOCUMENTS

| 1225358 | 9/1966 | Fed. Rep. of Germany | 901/37 |
|---|---|---|---|
| 2008678 | 6/1983 | Fed. Rep. of Germany | 901/38 |
| 3322142 | 12/1984 | Fed. Rep. of Germany | 901/37 |
| 2424797 | 11/1979 | France | 901/37 |
| 770790 | 10/1980 | U.S.S.R. | 901/31 |

Primary Examiner—Robert J. Spar
Assistant Examiner—William M. Hienz
Attorney, Agent, or Firm—Kurt Kelman

[57] ABSTRACT

A system for handling workpieces comprises a carrier frame and a gripper device secured to the carrier frame and actuatable to grip a respective workpiece. The gripper device comprises a housing including a cylindrical housing member and a bearer head adjoining one end of the cylindrical housing member and carrying a gripper, and an operating device for the gripper arranged in the housing member. The handling system further comprises a bearing for the cylindrical housing member, which has a surface configuration designed to enable the housing member to fit the bearing and to be held thereby, and a coupling device cooperating with the bearing head and holding the bearing head non-rotatably with respect to the bearing.

7 Claims, 1 Drawing Sheet

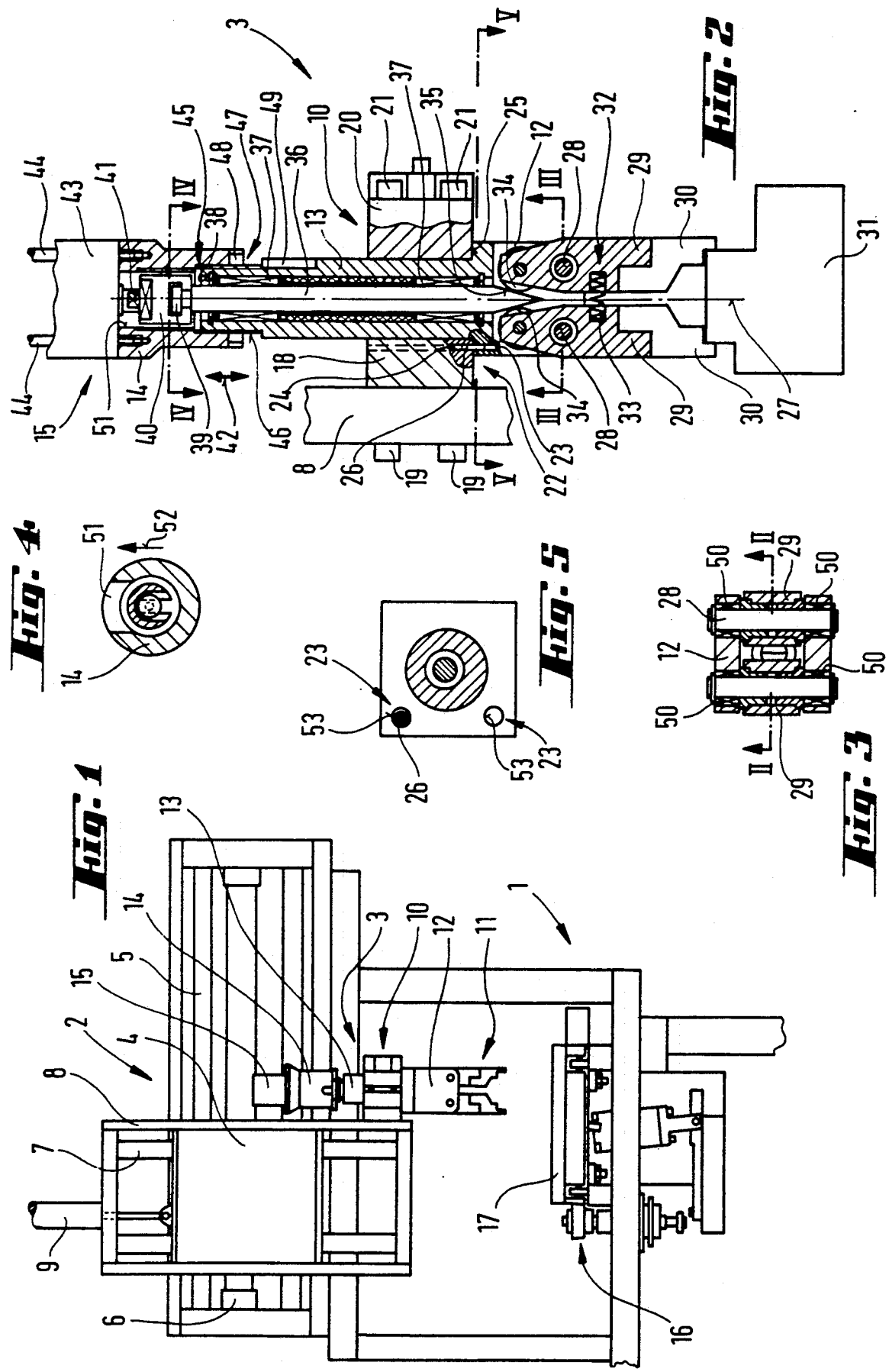

HANDLING SYSTEM FOR WORKPIECES

CROSS-REFERENCE TO RELATED APPLICATIONS

This is a continuation of my copending U.S. application Ser. No. 07/300,222, filed Jan. 23, 1989, which is a continuation of my application Ser. No. 07/175,608, filed Mar. 28, 1988, which is a continuation of my application Ser. No. 06/804,292, filed Dec. 3, 1985, all now abandoned.

BACKGROUND OF THE INVENTION

1. Field of the Invention

The invention relates to a system for handling assembly parts or workpieces, comprising a gripper device with adjustable gripper elements, e.g. pivotable gripper jaws, and housing guiding and/or driving devices for the gripper elements, and a carrier frame of the handling system coupled with the gripper device for movement therewith.

2. Description of the Prior Art

Various handling systems, also referred to as workpiece feed systems or manipulator devices, are known. In such a device for infeed or extraction of assembly parts according to my U.S. Pat. No. 4,369,872, several rectilinear guiding tracks are aligned at an angle to each other and allow for a movement of a gripper device in three spatial directions. In this known handling system, the gripper device has a guiding means secured with a clamping means in an intermediate carrier. The intermediate carrier is displaceable along a guiding track in a bracket or holder which is displaceable at right angles to the guiding track. Thanks to this construction of the gripper device with a guiding means, different gripper devices may be secured to the same clamping means of the intermediate carrier so that a replacement of the gripper device is easily possible. The gripper device, however, is assembled from separate parts so that the production of such gripper devices is comparatively costly. While this handling system proved very satisfactory in practice, it has been found that it does not provide a satisfactory solution in all applications.

SUMMARY OF THE INVENTION

The invention has as its object a system for handling assembly parts, which comprises an optimum number of analogously constructed and dimensioned parts.

It is a further object of this invention to use these analogous parts to construct the gripper device of the handling system as a fixedly installed gripper, as a rotary gripper or as a pivotal gripper, so that it is possible to perform a plurality of the sequences of motion primarily occurring in automatic assembling operations.

The above and other objects are accomplished according to the present invention with a system for handling workpieces, which comprises a carrier frame, a gripper device comprising a workpiece gripping means actuatable to grip a respective workpiece, a housing including a cylindrical housing member and a bearer head adjoining one end of the cylindrical housing member and carrying the gripping means, and means for actuating the gripping means arranged in the housing. Bearing means is provided for the cylindrical housing member which has a surface configuration designed to enable the housing member to fit the bearing means and being held thereby, and a coupling device cooperates with the bearing head and holds the bearing head non-rotatably with respect to the bearing means.

Thanks to the utilization of a cylindrical housing member, the gripper device can hold bearings and driving elements and can be held in a clamping device. Because the same gripper device may be installed stationarily as well as pivotally or rotatably, it is universally usable for the most varied applications. Furthermore, the coupling device enables the cylindrical housing member to be held against rotation or to be used for installing other elements in a non-rotary manner. The universal applicability of the gripper device is thereby additionally enhanced.

According to one feature of the invention, the cylindrical housing member is held in a two-piece clamping device and the coupling device comprises coupling elements arranged in a plane extending at right angles to the longitudinal axis of the cylindrical housing member and cooperating with coupling elements arranged in the bearer head. An intermediate plate may be arranged between the clamping device and the bearer head, which also has coupling elements cooperating with coupling elements of the coupling device. It is thus possible not only to secure the cylindrical housing member and thus the gripper device in non-rotary or twist-proof manner to the clamping device, but the intermediate plate provides a stop also secured against relative rotation, so that a pivotal displacement of the gripper device caused by a pivotal displacement of the clamping device may be limited by this stop.

It is also possible according to the invention for one coupling element to be formed as an external screw-thread and to provide a bell-shaped support member which has an internal screw-thread coupling element, whereon is installed a driving device which cooperates with the gripper elements housed in the bearer head. The external screw-thread coupling element may also be utilized to bear the driving device for the gripper elements installed in the bearer head.

According to another advantageous embodiment of the invention, the cylindrical housing member comprises at least one longitudinal guiding track for a guiding rod coupled with a piston rod of the driving device and with the gripper elements through a lost motion coupling. This facilitates the actuation of the gripper elements, excessive wear of the sealing elements of the driving device being prevented by the lost motion coupling between the guiding rod and the driving device.

It is also possible, however, for the gripper elements to be formed by gripper jaws or shoes displaceable transversely to the longitudinal axis of the cylindrical housing member, their opening motion being limited by the guiding rod. The guiding rod may thereby take on the simultaneous function of a stop device.

According to another embodiment of the invention, the two gripper jaws have provided between them a spring system biasing them in the opening direction and a stop device which is adjustable to determine the closed and/or open setting, and the driving device and guiding rod associated with the two gripper jaws are aligned at right angles to the direction of motion of the gripper jaws. The advantage of this solution consists in that an action on the driving device is needed only when the gripper jaws are to grasp an assembly part. Furthermore, the arrangement of the driving device and guiding rod aligned at right angles to the direction of motion of the gripper jaws provides a small-diameter gripper device.

It is also advantageous if the gripper jaws have seats for gripper inserts and are pivotally mounted around parallel axes, and a spreader element is connected to the guiding rod to act on the gripper jaws opposite to the seats for the gripper inserts. The spreader element may thereby be arranged as a terminal stop for the opening of the gripper jaws and at the same time as an actuating element for closing the gripper jaws to grasp assembly parts.

It is also advantageous if the bearer head and/or the cylindrical housing member are constructed with substantially identical dimensions and/or cross-sectional shapes, since this renders it possible to combine the fundamental components in the manner of a building set into handling systems of varying complexity, with rigid grippers or pivotal or rotational grippers.

It is also possible according to the invention for the coupling elements of the coupling devices to be formed by like aligned bores, and for these to have allocated to them set pins as mating coupling elements, so that, by appropriate selection of the length of the set pins, several directly contiguous parts formed with analogous coupling bores may be coupled together in correct and centered position.

BRIEF DESCRIPTION OF THE DRAWINGS

The invention will now be described, by way of example, with reference to the accompanying partly diagrammatic drawings, in which:

FIG. 1 is a side elevation of a handling system according to the invention, which comprises a gripper device fixed with respect thereto and which forms part of a fully automatic assembling machine for the production of workpieces assembled from separate assembly parts;

FIG. 2 is a sectional elevation of the gripper device according to FIG. 1 taken along the lines II—II in FIG. 3;

FIG. 3 is a partly sectional bottom view of the gripper device of FIG. 1 along the line III—III in FIG. 2;

FIG. 4 is a sectional plan view of the gripper device taken along the line IV—IV in FIG. 2; and FIG. 5 is a sectional plan view of the gripper device taken along the lines V—V in FIG. 2.

DETAILED DESCRIPTION OF PREFERRED EMBODIMENT

A working station of a fully automatic assembling machine 1, in which a handling system 2 comprising a gripper device 3 is situated, is illustrated in FIG. 1. The handling system 2 comprises an intermediate carrier 4 which is movable by a cylinder 6 lacking a piston rod along guide rods 5 of circular cross section. In the intermediate carrier 4 are mounted guiding posts 7 supported in a carrier frame 8 which is displaceable with respect to the intermediate carrier 4 by means of a drive 9 situated on said frame. The gripper device 3 is secured on the carrier frame 8 by a clamping device 10. The gripper device 3 comprises a bearer head 12 carrying the gripper elements 11 and adjacent thereto a cylindrical housing member 13. A bell-shaped support element 14 carrying a driving device 15 is secured on the cylindrical housing member 13.

The gripper device 3 is arranged above a conveyor 16 provided on the machine table of the assembling machine 1, so that assembling or fitting or analogous operations may be performed on workpiece carriers 17 displaced by the conveyor 16. The form of the conveyor or of the workpiece carriers 17 may advantageously be as disclosed in my U.S. Pat. Nos. 4,530,287, 4,619,205 and 4,492,297. It is evidently also possible to use the inventive handling system 2 with any differently constructed conveyor or assembling machine.

As seen in FIG. 2 a clamping jaw 18 of the clamping device 10 is secured by screws 19 to a part of the frame 8. The cylindrical housing member 13 is clamped between the clamping jaw 18 and another clamping jaw 20 of the clamping device 10. The two clamping jaws 18 and 20 are pressed against each other by means of clamping screws 21. A coupling device 22 is arranged between the clamping jaw 18 and the bearer head 12. The coupling device comprises aligned bores 23 and 24 respectively defined in an end face 25 of the bearer head 12 and in a facing end face of the clamping jaw 18, and a coupling pin 26 inserted in aligned coupling bores 23 and 24 to secure the bearing head against relative twisting in relation to the clamping device. Bearer head 12 carries gripper jaws 29 which are pivotable around spindles 28 extending parallel to each other and at right angles to a longitudinal axis 27 of the cylindrical housing member 13. These jaws have seats for gripper inserts 30 of a shape suitably adapted to match that of the assembly parts 31 which are to be grasped. The two gripper jaws 29 are forced apart by means of a spring system 32 arranged between the gripper inserts 30 and the spindles 28, e.g. by a compression spring 33. Rollers 34 at the ends of the gripper jaws bear on oblique surfaces of a spreader element 35 disposed at the lower end of guiding rod 36. The guiding rod 36 is guided by ball-bearing guides 37 in an internal bore 38 of the cylindrical housing member 13. The ball bearing guides 37 are spaced from each other in the inner bore 38 by a spacing sleeve and secured in position by retaining rings. The guiding rod 36 has a head portion 39 suspended in a bearing block 40 which is coupled to a connecting rod 41 of the driving device 15 for axial up and down displacement of the guiding rod 36 as indicated by the double-headed arrow 42. The driving device 15 formed by a piston-cylinder system 43 is bolted on the bell-shaped support element 14 by means of two screws 44. The bell-shaped support element is supported on cylindrical housing member 13 by means of a coupling element 45 having an internal screw-thread and a coupling element 46 having an outer screw-thread, which jointly form a coupling device 47. The support element 14 is secured in position on the coupling element 46 by means of a locknut 48.

The coupling element 46 of the coupling device 47 also has a coupling groove 49.

The mounting of the spindles 28 in the bearer head 12 and the mounting of the gripper jaws 29 on the spindles 28 is illustrated in particular in FIG. 3. Each spindle 28 is journalled in the bearer head 12 by roller bearings 50 and spindle sections projecting beyond the bearer head 12 are held in position by retaining rings. The gripper jaws 29 are positioned on the spindles 28 by spacing sleeves which at the same time position the roller bearings 50 in the bearer head 12.

The bell-shaped support member 14 as shown in FIG. 4 has a slot 51 extending parallel to the guiding rod 36. Thanks to this slot 51, it is possible after releasing the screws 44, to push the driving device 15 off the guiding rod 36 by lateral displacement as shown by arrow 52, so that, for example in the case of a fault, the driving device may be replaced rapidly by a new component. This allows of an exchange of the driving device, without having to replace or release additional parts of the gripper device 3.

The coupling elements 23 consisting of bores 53 are more clearly apparent from FIG. 5, said bores being defined in an end face of the clamping device 10. The coupling element 26 formed by a set pin is illustrated in FIG. 5 only in one of the two coupling elements 23.

Whilst the invention and many of its attendant advantages will be understood from the foregoing description, it will be apparent that various changes may be made in the form construction and arrangement of the parts without departing from the spirit and scope of the invention or sacrificing all of its material advantages, the forms hereinbefore described merely being preferred embodiments thereof.

What is claimed is:

1. A system for handling a workpiece, comprising
  (a) a carrier frame,
  (b) a gripper device secured to the carrier frame, the gripper device comprising
    (1) gripping means having gripping elements actuatable to
    (2) a housing including a cylindrical housing member and a bearer head adjoining one end of the cylindrical housing member and carrying the gripping means,
    (3) means for actuating the gripping means arranged in the housing, the actuating means comprising a guiding rod extending through the cylindrical housing member and cooperating with the gripping elements, the cylindrical housing member defining a longitudinal guide for the guiding rod, and
    (4) a driving device coupled to the guiding rod at an end of the cylindrical housing member opposite the one end for moving the guiding rod along the longitudinal guide and thereby to actuate the gripping means,
  (c) bearing means for the cylindrical housing member, the bearing means comprising
    (1) a clamping device holding the cylindrical housing member and securing the housing member with respect to the carrier frame, the clamping device comprising two cooperating clamping parts clamping the cylindrical housing member therebetween radially with respect to a longitudinal axis of the cylindrical housing member, the clamping parts and the bearer head having facing end faces extending in planes extending perpendicularly to the longitudinal axis of the cylindrical housing member, and
    (2) the cylindrical housing member having a surface configuration designed to enable the housing member to fit the bearing means and to be held thereby,
  (d) a first coupling device between the bearer head and the clamping device and cooperating therewith for holding the bearer head non-rotatably with respect to the bearing means, the first coupling device comprising
    (1) aligned bores extending in the end faces of the bearer head and the clamping parts substantially parallel to the longitudinal axis and holding pins inserted into the aligned bores, and
  (e) wherein the driving device is replaceably coupled to the guiding rod at the opposite cylindrical housing member end.

2. The handling system of claim 1, wherein the gripping means comprises two cooperating gripping ones of said elements actuatable to grip the respective workpiece.

3. The handling system of claim 1, wherein the opposite cylindrical housing member end has an outer thread, and further comprising a support element for the driving device, the support element having an inner thread cooperating with the outer thread on the opposite cylindrical housing member end, the inner and outer threads constituting a second coupling device.

4. The handling system of claim 1, wherein the driving device comprises a piston rod.

5. The handling system of claim 1, wherein the gripping elements are pivotal about axes extending transversely to the longitudinal axis of the cylindrical housing member, and the driving device moves the guiding rod into engagement with the gripping elements for pivoting the gripping elements.

6. The handling system of claim 5, further comprising spring means biased to pivot the gripping elements apart into an open position, the guiding rod being arranged to be driven perpendicularly to the pivot axes of the gripping elements for pivoting the gripping elements into a closed position against the bias of the spring means.

7. The handling system of claim 6, wherein the pivot axes of the gripping elements are located between respective ends thereof, one of the gripping element ends being remote from the guiding rod and carrying gripping inserts, and further comprising a spreader element on the guiding rod, the spreader element being arranged to move between the gripping element ends opposite the one ends.

* * * * *